US012167190B2

(12) United States Patent
Jurkiewicz et al.

(10) Patent No.: US 12,167,190 B2
(45) Date of Patent: Dec. 10, 2024

(54) ACOUSTIC PORT COVER

(71) Applicant: Cochlear Limited, Macquarie University (AU)

(72) Inventors: Tadeusz Jurkiewicz, Macquarie University (AU); Nathan Isaacson, Macquarie University (AU)

(73) Assignee: Cochlear Limited, Macquarie University (AU)

( * ) Notice: Subject to any disclaimer, the term of this patent is extended or adjusted under 35 U.S.C. 154(b) by 38 days.

(21) Appl. No.: 17/787,068

(22) PCT Filed: Dec. 9, 2020

(86) PCT No.: PCT/IB2020/061702
§ 371 (c)(1),
(2) Date: Jun. 17, 2022

(87) PCT Pub. No.: WO2021/140380
PCT Pub. Date: Jul. 15, 2021

(65) Prior Publication Data

US 2023/0069343 A1 Mar. 2, 2023

Related U.S. Application Data

(60) Provisional application No. 62/958,016, filed on Jan. 7, 2020.

(51) Int. Cl.
*H04R 1/08* (2006.01)
*H04R 19/04* (2006.01)
*H04R 25/00* (2006.01)

(52) U.S. Cl.
CPC ............ *H04R 1/086* (2013.01); *H04R 19/04* (2013.01); *H04R 25/604* (2013.01);
(Continued)

(58) Field of Classification Search
CPC .... H04R 1/086; H04R 25/609; H04R 25/604; H04R 25/65; H04R 25/60; H04R 19/04; H04R 2201/003; H04R 2225/67
(Continued)

(56) References Cited

U.S. PATENT DOCUMENTS

2011/0222716 A1 9/2011 Ho et al.
2013/0202139 A1* 8/2013 Lackert ................ H04R 25/456 381/317
(Continued)

FOREIGN PATENT DOCUMENTS

CN 102473407 A 5/2012
CN 108933984 A 12/2018
(Continued)

OTHER PUBLICATIONS

International Search Report and Written Opinion in counterpart International Application No. PCT/IB2020/061702, mailed Mar. 15, 2021, 10 pages.
(Continued)

*Primary Examiner* — Ahmad F. Matar
*Assistant Examiner* — Sabrina Diaz
(74) *Attorney, Agent, or Firm* — Edell, Shapiro & Finnan, LLC

(57) ABSTRACT

Presented herein are acoustic port covers for attachment to electronic devices. An electronic device includes a housing having at least one acoustic port extending through the housing. An acoustic port cover in accordance with embodiments presented herein is configured to be detachably coupled to the housing so as to cover the at least one acoustic port and function as a barrier to the accumulation of foreign materials/contaminants at a protective membrane associated with the at least one acoustic port.

19 Claims, 11 Drawing Sheets

(52) U.S. Cl.
CPC ........... *H04R 25/609* (2019.05); *H04R 25/65* (2013.01); *H04R 2201/003* (2013.01); *H04R 2225/67* (2013.01)

(58) Field of Classification Search
USPC ................................. 381/324, 322, 325, 330
See application file for complete search history.

(56) References Cited

U.S. PATENT DOCUMENTS

| | | | | |
|---|---|---|---|---|
| 2016/0378142 | A1* | 12/2016 | Cardinali ................. | H04R 1/00 361/679.56 |
| 2017/0118567 | A1* | 4/2017 | Larssen ................ | H04R 25/654 |
| 2018/0139547 | A1 | 5/2018 | Pedersen et al. | |
| 2018/0343525 | A1* | 11/2018 | Karlsen .................. | H04R 25/02 |
| 2020/0059739 | A1* | 2/2020 | Weibel ..................... | H04R 1/04 |

FOREIGN PATENT DOCUMENTS

| | | | | |
|---|---|---|---|---|
| EP | 3367701 | A1 * | 8/2018 | ............. H04R 25/65 |
| JP | 2007522774 | A | 8/2007 | |
| WO | 2020/016778 | A2 | 1/2020 | |

OTHER PUBLICATIONS

Chew, Tung Shen et al., "Avoiding Epic Fails in MEMS Microphones", What You Need to Know about Microphone Arrays, 2017, 13 pages.

* cited by examiner

ACOUSTIC PORT COVER

BACKGROUND

Field of the Invention

The present invention relates generally to acoustic port covers for electronic devices.

Related Art

Medical devices have provided a wide range of therapeutic benefits to recipients over recent decades. Medical devices can include internal or implantable components/devices, external or wearable components/devices, or combinations thereof (e.g., a device having an external component communicating with an implantable component). Medical devices, such as traditional hearing aids, partially or fully-implantable hearing prostheses (e.g., bone conduction devices, mechanical stimulators, cochlear implants, etc.), pacemakers, defibrillators, functional electrical stimulation devices, and other medical devices, have been successful in performing lifesaving and/or lifestyle enhancement functions and/or recipient monitoring for a number of years.

The types of medical devices and the ranges of functions performed thereby have increased over the years. For example, many medical devices, sometimes referred to as "implantable medical devices," now often include one or more instruments, apparatus, sensors, processors, controllers or other functional mechanical or electrical components that are permanently or temporarily implanted in a recipient. These functional devices are typically used to diagnose, prevent, monitor, treat, or manage a disease/injury or symptom thereof, or to investigate, replace or modify the anatomy or a physiological process. Many of these functional devices utilize power and/or data received from external devices that are part of, or operate in conjunction with, implantable components.

SUMMARY

In one aspect, an apparatus is provided. The apparatus comprises: a housing; at least one acoustic port extending through the housing; a microphone positioned within the housing and comprising a sound inlet acoustically coupled to the at least one acoustic port; at least one acoustic port cover configured to be detachably coupled to the housing to shield the at least one acoustic port from direct exposure to contaminants; and at least one acoustic channel extending between the at least one acoustic port cover and the housing configured to acoustically couple the at least one acoustic port to an external environment of the housing.

In another aspect, an acoustic port cover is provided. The acoustic port cover comprises: an outer surface; an inner surface configured to be detachably coupled to a housing of an electronic device so as fully cover at least one acoustic port extending through the housing of the electronic device; and one or more channels extending along the inner surface from the at least one acoustic port to the outer surface in a direction that is transverse to an elongate axis of the at least one acoustic port to the outer surface of the acoustic port cover.

In another aspect, an apparatus is provided. The apparatus comprises: a housing comprising one or more first engagement features; at least one acoustic port extending through the housing about a first elongate axis; a microphone positioned within the housing and comprising a sound inlet acoustically coupled to the at least one acoustic port; at least one acoustic port cover comprising one or more second engagement features configured to mechanically mate with the one or more first engagement features of the housing; at least one acoustic channel extending between the at least one acoustic port cover and the housing configured to acoustically couple the at least one acoustic port to an external environment of the housing, wherein the at least one acoustic channel is disposed generally transverse to the at least first elongate axis of the at least one acoustic port; and a protective membrane positioned between the at least one acoustic port and the at least one acoustic channel.

BRIEF DESCRIPTION OF THE DRAWINGS

Embodiments of the present invention are described herein in conjunction with the accompanying drawings, in which.

DETAILED DESCRIPTION

Presented herein are acoustic port covers (acoustic port protectors) for attachment to electronic devices. An electronic device includes a housing having at least one acoustic port extending through the housing. An acoustic port cover in accordance with embodiments presented herein is configured to be detachably coupled to the housing so as to cover the at least one acoustic port and function as a barrier to the accumulation of foreign materials/contaminants at a protective membrane associated with the at least one acoustic port.

Merely for ease of description, the acoustic port covers presented herein are primarily described with reference to one illustrative electronic device/apparatus, namely a medical device in the form of a cochlear implant. However, it is to be appreciated that the acoustic port covers presented herein may also be used with a variety of other devices that include one or more acoustic ports positioned within a housing. For example, the acoustic port covers presented herein may be used with computers (e.g., desktops, thin clients, laptops, tablet computers, etc.), mobile devices (e.g., mobile phones), or other consumer electronic devices, other medical devices, such as other auditory prostheses, including acoustic hearing aids, bone conduction devices, middle ear auditory prostheses, direct acoustic stimulators, auditory brain stimulators), etc., and/or other any apparatuses having one or more acoustic ports.

Figure 1:
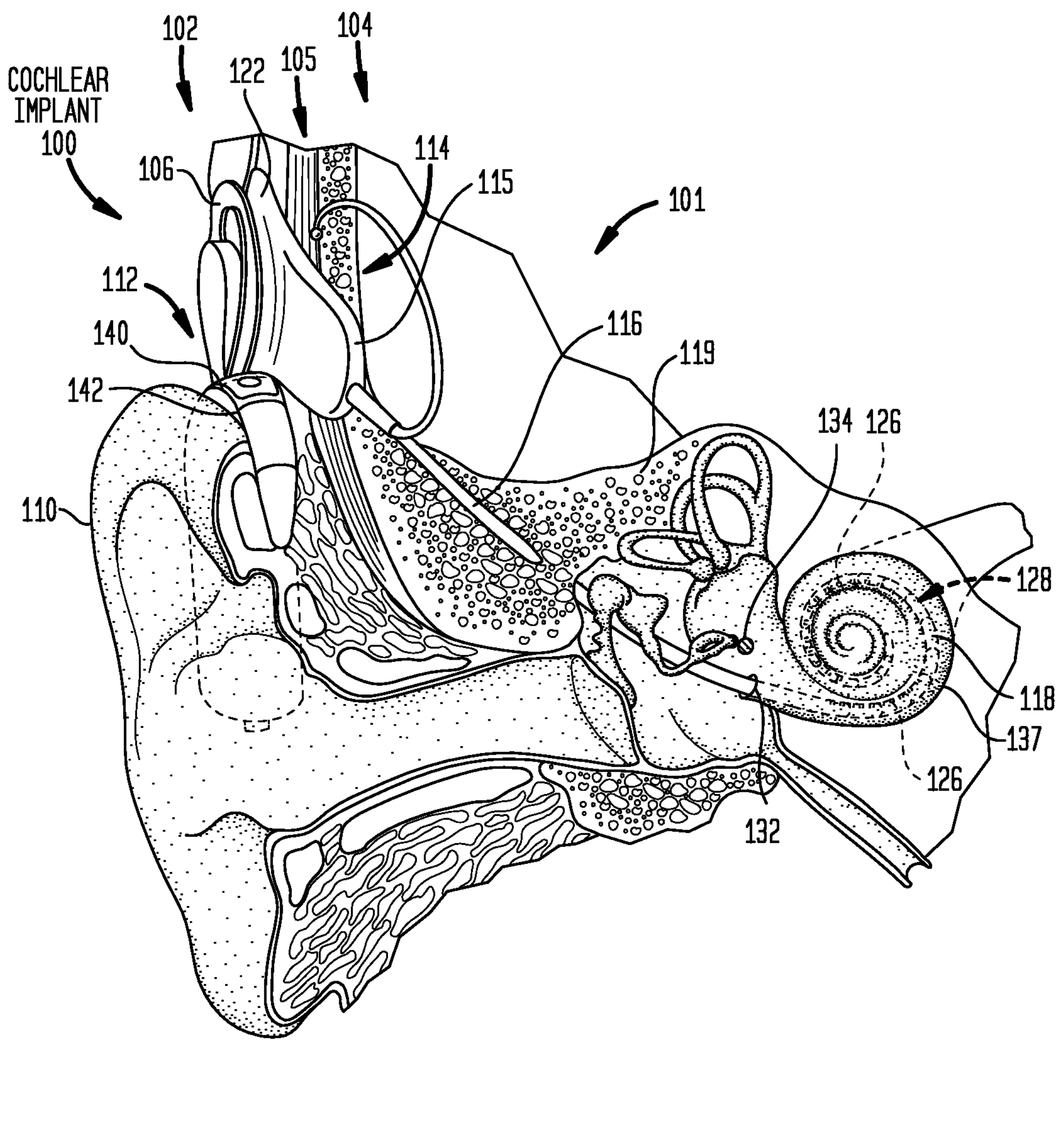
FIG. 1 is a schematic diagram illustrating a cochlear implant that includes an acoustic port cover, in accordance with certain embodiments presented herein.

FIG. 1 is simplified schematic view of an example cochlear implant 100 that includes an acoustic port cover (acoustic port protector) 150 in accordance with certain embodiments presented herein. In FIG. 1, the cochlear implant 100 is shown partially implanted in the head 101 of a recipient.

The cochlear implant 100 comprises an external component 102 and an internal/implantable component 104. The external component 102 is configured to be directly or indirectly attached to the body of the recipient and typically comprises an external coil 106 and, generally, a magnet (not shown in FIG. 1) fixed relative to the external coil 106. The external component 102 also comprises one or more sound input elements/devices (not shown in FIG. 1) for receiving sound signals at a sound processing unit (sound processor) 112. In this example, the one or more sound input devices may include, for example, a plurality of microphones configured to capture/receive acoustic sound signals, one or more auxiliary input devices (e.g., audio inputs, such as a Direct Audio Input (DAI), data ports, such as a Universal Serial Bus (USB) port, cable port, etc.) configured to receive, and a wireless transmitter/receiver (transceiver), each located in, on, or near the sound processing unit 112.

The one or more auxiliary input devices and the wireless transceiver are configured to receive electrical signals that include sound data. As such, received sound signals may include acoustic signals, electrical signals that include sound data, etc. It is also to be appreciated that the sound processing unit 112 could also or alternatively include other types of input devices, such as telecoils.

The sound processing unit 112 includes a housing 140 that comprises one or more acoustic ports/openings (not shown in FIG. 1) which allow acoustic sounds to enter the housing 140. As described further below, in the examples presented herein, the acoustic ports in housing 140 are protected by at least one acoustic port cover 150 that is detachably coupled to the housing 140. That is, the sound processing unit 112 and the acoustic port cover 150 are configured to mechanically couple/mate with another such that the acoustic port cover 150 is retained on the housing in the absence of an applied external force. As described further below, when coupled with the housing 140, the acoustic port cover 150 shields/covers the acoustic port(s) in the housing from direct exposure to foreign materials/contaminants (e.g., water, sweat, dirt, dust, etc.), but still allow/enable acoustic sound signals to enter the housing via the acoustic port(s).

Although not shown in FIG. 1, the sound processing unit 112 may also include a number of other functional components. For example, the sound processing unit may include, for example, at least one power source (e.g., battery), a radio-frequency (RF) transceiver, and a processing module. The processing module may be formed by any of, or a combination of, one or more processors (e.g., one or more Digital Signal Processors (DSPs), one or more uC cores, etc.), firmware, software, etc. arranged to perform, for example, sound processing and sound coding operations. The processing module may be implemented on a printed circuit board (PCB) or some other arrangement.

In the example of FIG. 1, the external component 102 comprises a behind-the-ear (BTE) sound processing unit 112 configured to be attached to, and worn adjacent to, the recipient's ear and a separate coil 106. However, it is to be appreciated that embodiments of the present invention may be implemented with systems that include other arrangements, such as an off-the-ear (OTE) sound processing unit (i.e., a component having a generally cylindrical shape and which is configured to be magnetically coupled to the recipient's head which includes an integrated coil), a mini or micro-BTE unit, an in-the-canal unit that is configured to be located in the recipient's ear canal, a body-worn sound processing unit, etc.

Returning to the example embodiment of FIG. 1, the implantable component 104 comprises an implant body (main module) 114, a lead region 116, and an intra-cochlear stimulating assembly 118, all configured to be implanted under the skin/tissue (tissue) 105 of the recipient. The implant body 114 generally comprises a hermetically-sealed housing 115 in which RF interface circuitry (not shown in FIG. 1) and a stimulator unit (also not shown in FIG. 1) are disposed. The implant body 114 also includes an internal/implantable coil 122 that is generally external to the housing 115, but which is connected to the RF interface circuitry via a hermetic feedthrough (not shown in FIG. 1).

Stimulating assembly 118 is configured to be at least partially implanted in the recipient's cochlea 137. Stimulating assembly 118 includes a plurality of longitudinally spaced intra-cochlear electrical stimulating contacts (electrodes) 126 that collectively form a contact or electrode array 128 for delivery of electrical stimulation (current) to the recipient's cochlea. Stimulating assembly 118 extends through an opening in the recipient's cochlea (e.g., cochleostomy, the round window, etc.) and has a proximal end connected to stimulator unit via lead region 116 and a hermetic feedthrough (not shown in FIG. 1). Lead region 116 includes a plurality of conductors (wires) that electrically couple the electrodes 126 to the stimulator unit.

As noted, the cochlear implant 100 includes the external coil 106 and the implantable coil 122. The coils 106 and 122 are typically wire antenna coils each comprised of multiple turns of electrically insulated single-strand or multi-strand platinum or gold wire. Generally, a magnet is fixed relative to each of the external coil 106 and the implantable coil 122. The magnets fixed relative to the external coil 106 and the implantable coil 122 facilitate the operational alignment of the external coil with the implantable coil. This operational alignment of the coils 106 and 122 enables the external component 102 to transmit data, as well as possibly power, to the implantable component 104 via a closely-coupled wireless link formed between the external coil 106 with the implantable coil 122. In certain examples, the closely-coupled wireless link is a radio frequency (RF) link. However, various other types of energy transfer, such as infrared (IR), electromagnetic, capacitive and inductive transfer, may be used to transfer the power and/or data from an external component to an implantable component and, as such, FIG. 1 illustrates only one example arrangement.

In operation, the processing module of sound processing unit 112 is configured to convert sound/audio signals received/captured at one or more of the input elements/devices into stimulation control signals for use in stimulating a first ear of a recipient (i.e., the processing module is configured to perform sound processing on input audio signals received at the sound processing unit 112). In the embodiment of FIG. 1, the stimulation control signals are provided to an RF transceiver, which transcutaneously transfers the stimulation control signals (e.g., in an encoded manner) to the implantable component 104 via external coil 106 and implantable coil 122. That is, the stimulation control signals are received at the RF interface circuitry via implantable coil 122 and provided to the stimulator unit. The stimulator unit is configured to utilize the stimulation control signals to generate electrical stimulation signals (e.g., current signals) for delivery to the recipient's cochlea via one or more stimulating contacts 126. In this way, cochlear implant 100 electrically stimulates the recipient's auditory nerve cells, bypassing absent or defective hair cells that normally transduce acoustic vibrations into neural activity, in a manner that causes the recipient to perceive one or more components of the input audio signals.

As noted, in the arrangement of FIG. 1, the sound processing unit 112 is an external component that, during operation, is worn by the recipient of the cochlear implant 100. Since the sound processing unit 112 includes the sound input devices, such as microphones, and since the sound processing unit 112 is configured to process the received sound signals, the sound processing unit 112 must be worn (and operational) in order for the recipient to hear sounds. However, an auditory prosthesis recipient may encounter wet, humid, dusty, or other environments in which foreign materials/contaminants (e.g., water, sweat, moisture, dirt, dust, chemicals, etc.) could potentially damage the sound input devices, sound processing elements, power source, etc. within the housing 140 of the sound processing unit 112. Traditionally, in such situations a recipient has been forced to either remove the sound processing unit 112 before entering the potentially damaging environment (e.g., before swimming) or, in less extreme cases, rely on the rigid housing 140, to protect the electrical components from ingress of water, dust, or other contaminants. Both of these options are unsatisfactory and potentially create safety issues. In particular, as noted, removal of the sound processing unit 112 eliminates the recipient's ability to hear warnings, instructions, etc. Additionally, housings, such as housing 140, are not manufactured so as to prevent the total ingress of fluids, dust, and other contaminants. This creates a potential danger to the recipient if the electrical components within the sound processing unit 112 are short-circuited or otherwise damaged.

The design of a waterproof (swimmable) sound processing unit, in particular, is challenging as there are many competing mechanical design considerations. In addition, in conventional arrangements, is has been difficult to create a microphone subassembly for sound processing unit such that the microphone is protected from ingress of water (or other contaminants), while maintaining an acceptable audio quality. One approach to addressing this issue is the use of a protective (contaminant-proof) membrane at the acoustic port. In operation, such protective membranes are positioned in or over the acoustic ports and are configured to allow acoustic signal to enter the acoustic ports. However, such protective membranes are also configured to prevent water, dust or other contaminates that could damage the internal workings of the device to pass through the protective membrane.

A protective membrane positioned in or over an acoustic port may have direct exposure to an external environment, meaning that the protective membrane is directly exposed to (i.e., may directly contact) a variety of contaminant such as hair, skin fats, oily residues, dust, dirt, etc. A protective membrane that has direct exposure (directly contact) with contaminants is thus susceptible to the accumulation (build-up) of those contaminants at the outer surface of the protective membrane. This accumulation is problematic as it can affect the acoustic characteristics of the protective membrane and the sound input device (e.g., microphone) utilizing the associated acoustic port sealed by the protective membrane. That is, as noted, protective membrane are configured to allow acoustic sound signals to pass there through and enter the acoustic ports. The accumulation of contaminants at the outer surface of a protective membrane may obstruct, attenuate, or otherwise impede the ability of acoustic sound signals to pass there through which, in turn negatively affects the operation of the and input device (e.g., microphone) utilizing the associated acoustic port (e.g., lower acoustic signal amplitude reaching the microphone may lead to lower captured sound quality).

The techniques presented herein can address many of these practical considerations which allow an acoustic port to be sealed with a protective membrane, while minimizing (e.g., reducing or eliminating) the accumulation of contaminants at the outer surface of a protective membrane. In particular, presented herein are acoustic port covers, sometimes referred to herein as an acoustic port protectors, that are configured to be detachably coupled to electronic device housings in a manner that shields protective membranes of acoustic ports from direct exposure to the external environment (i.e., provide a barrier between a protective membrane and an external environment). By shielding the protective membrane from the external environment, the acoustic port covers presented herein limit the amount of contaminants that can reach the protective membrane and, accordingly, limit the accumulation of contaminants at outer surface of the protective membrane.

For example, shown in FIG. 1 is an acoustic port cover 150 that, which attached to housing 140, covers the at least one acoustic port extending through the housing 140. In covering the at least one acoustic, the acoustic port cover 150 also conceals/shields a protective membrane (not shown in FIG. 1) that is used to seal that acoustic port from the entry of contaminants into the acoustic port. By covering the acoustic port and protective membrane, the acoustic port cover 150 limits the amount of contaminants that can reach the protective membrane and, accordingly, limit the accumulation of contaminants at outer surface of the protective membrane.

As described further below, acoustic port covers presented herein, such as the acoustic port cover 150, may define one or more acoustic channels that acoustically couple the at least one acoustic port to the external environment of the electronic device (e.g., sound processing unit 112). The one or more acoustic channels enable acoustic sound signals to reach the acoustic port that is covered by acoustic port cover, but also have an arrangement (e.g., length, cross-sectional shape, opening shape, etc.) that restrict or limit the contaminants that can traverse the or more acoustic channels and accumulate on the protective membrane.

Figure 2A:
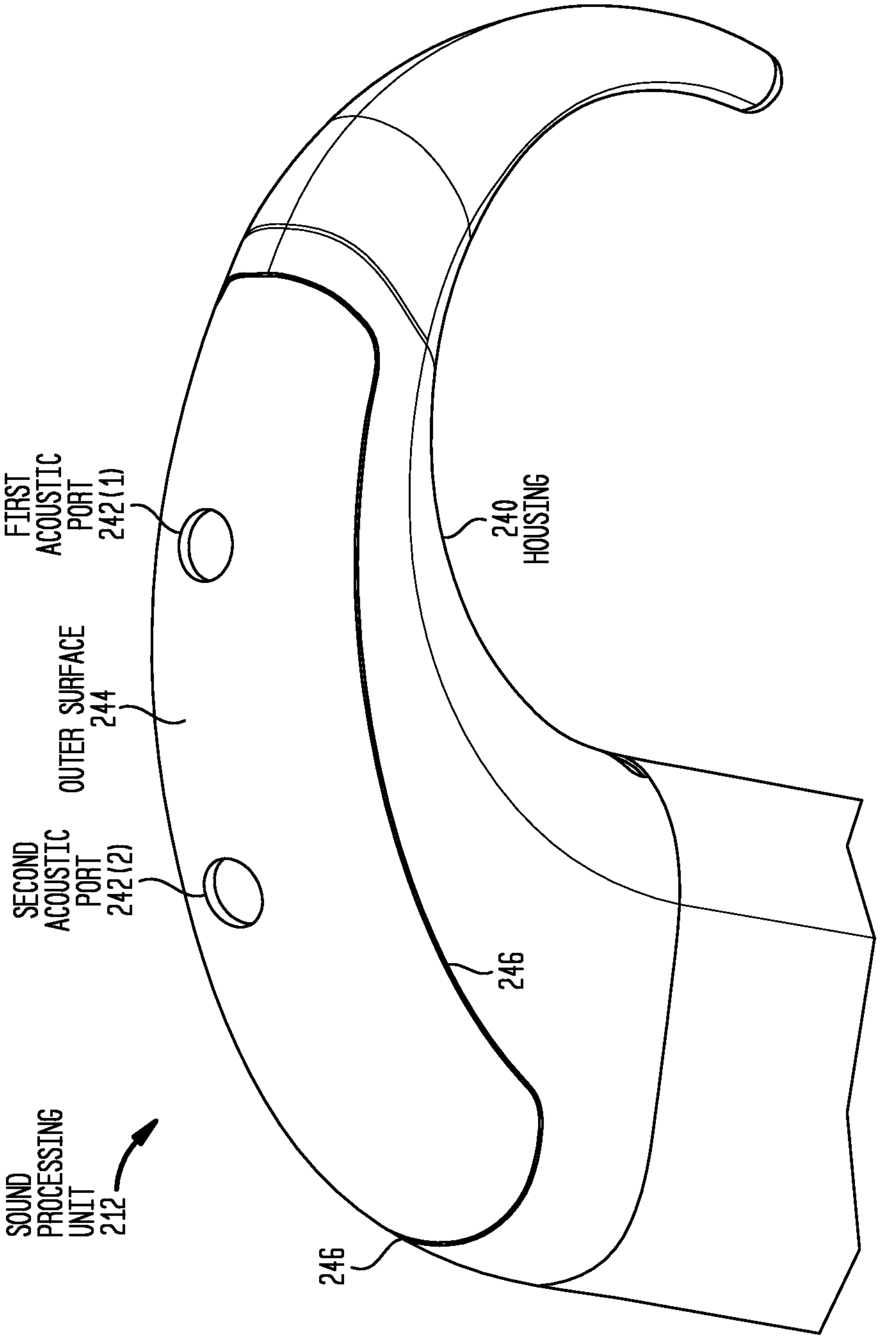
FIG. 2A is a perspective view of a portion of an auditory prosthesis component configured to be coupled to an acoustic port cover, in accordance with certain embodiments presented herein.

Further details of one example acoustic port cover in accordance with embodiments presented herein are provided below with reference to FIGS. 2A-2I. In particular, FIG. 2A is a perspective view of a housing 240 of an auditory prosthesis component 212 (e.g., sound processing unit, hearing aid, etc.) to which an acoustic port cover may be attached. As shown in FIG. 2A, the housing 240 includes first and second acoustic ports, referred to as first (front) acoustic port 242(1) and second (rear) acoustic port 242(2). The first and second acoustic ports 242(1) and 242(2) extend from an interior of the housing 240 to an outer surface 244 of the housing 240 (i.e., the acoustic ports extend through the housing).

As described further below, the auditory prosthesis component 212 includes first and second input devices, such as first and second microphones, disposed in the housing 140. The first input device is positioned within the housing 240 so as to be acoustically coupled to the first acoustic port 242(1). Similarly, the second acoustic port 242(2) is positioned within the housing 240 so as to be acoustically coupled to the second acoustic port 242(2).

As noted above, acoustic ports disposed on the outer surface of a housing are susceptible to ingress of contaminants, such as water, dirt, etc. As such, protective membranes may be positioned in or over the acoustic port to prevent such contaminants from entering the housing via the acoustic ports. However, in such a position, the protective membranes have direct exposure to an external environment and, accordingly, are susceptible to the problematic accumulation (build-up) of those contaminants at the outer surface of the protective membrane. Accordingly, presented herein are acoustic port covers that are configured to be detachably coupled to the housing of a device, such as housing 240 of the auditory prosthesis component 212, to protect the acoustic ports, and accordingly protect the protective membranes, from the accumulation of contaminants. To facilitate the attachment of an acoustic port cover, the outer surface 244 of housing 240 includes one or more engagement features 246 that are configured to mechanically couple/mate/interlock with one or more corresponding engagement features of an acoustic port cover, in accordance with embodiments presented herein. Further details of a mechanical engagement between the one or more engagement features of a housing and one or more engagement features of an acoustic port cover are provided.

Figure 2B:
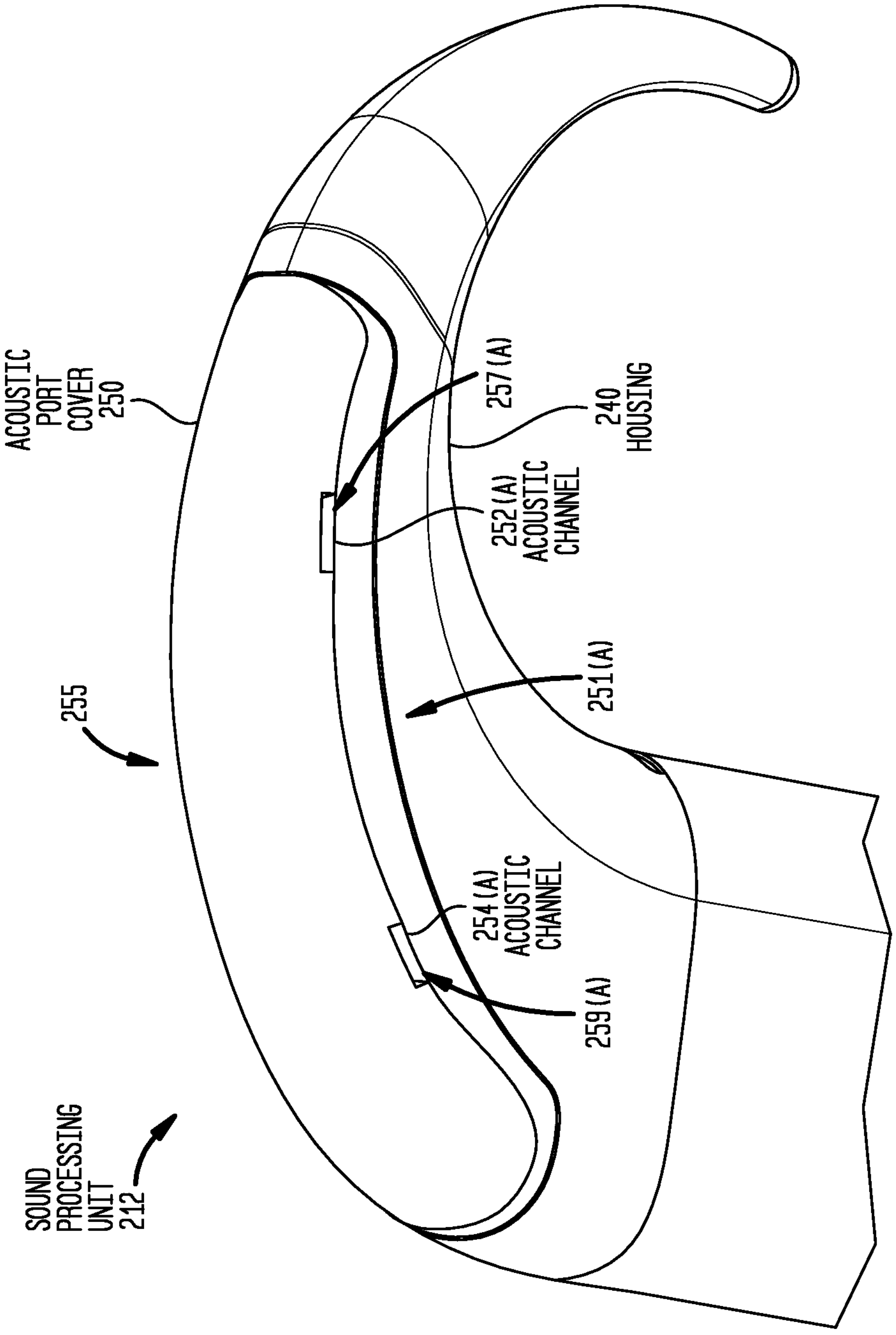
FIG. 2B is a first perspective view illustrating an acoustic port cover attached to the auditory prosthesis component of FIG. 2A, in accordance with certain embodiments presented herein.
Figure 2C:
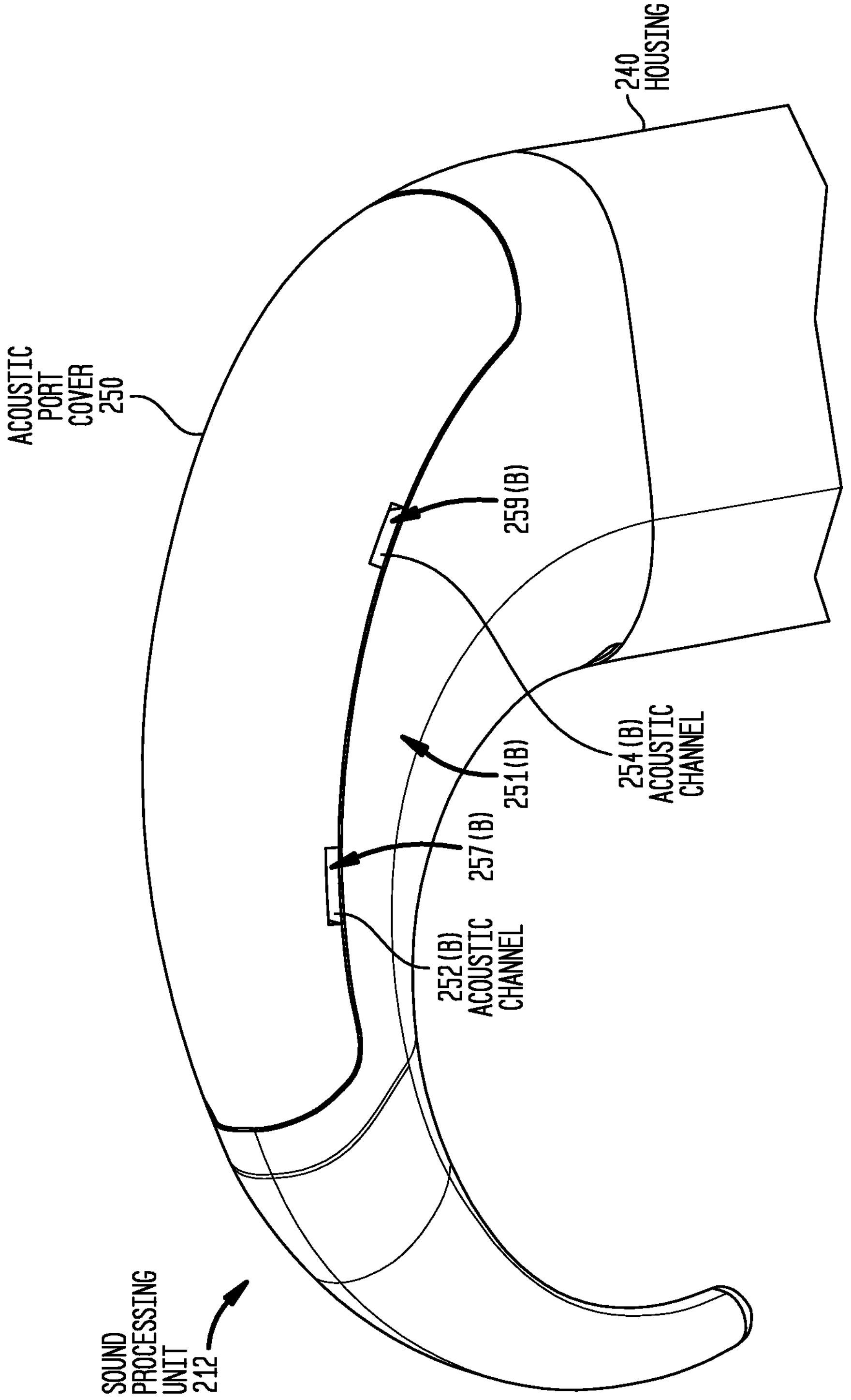
FIG. 2C is a second perspective view illustrating the acoustic port cover of FIG. 2B attached to the auditory prosthesis component of FIG. 2A, in accordance with certain embodiments presented herein.

In order to facilitate a complete understanding of the invention, FIG. 2A illustrates features of a housing 240 separate from any acoustic port cover. FIGS. 2B and 2C, however, are first and second perspective views of an acoustic port cover 250, in accordance with embodiments presented herein, which is shown attached to the outer surface 244 of the housing 240. In particular, FIG. 2B illustrates a first (e.g., right) side view of the acoustic port cover 250 and housing 240, while FIG. 2C illustrates a second (e.g., left) side view of the acoustic port cover 250 and housing 240.

As shown in FIGS. 2B and 2C, when attached to the outer surface 244, the acoustic port cover 250 covers the first acoustic port 242(1) and the second acoustic port 242(2). That is, the acoustic port cover 255 is configured to protect the acoustic ports 242(1) and 242(2), and thus protect the protective membranes positioned in or on the acoustic ports 242(1) and 242(2), from direct exposure to contaminants, such as dust, dirt, water, sweat etc. (e.g., limit or restrict the number and/or type of contaminants that can directly contact an outer surface of the protective membranes).

Shown in FIG. 2B are two acoustic channels, namely acoustic channels 252(A) and 254(A). Acoustic channel 252(A) is an opening that extends through acoustic port cover 250 from the external environment outside of the housing 240 to the first acoustic port 242(1) (i.e., the acoustic channels are un-impeded from the external environment to the protective membrane). As such, the acoustic channel 252(A) acoustically couples the first acoustic port 242(1) to the external environment of the auditory prosthesis component 212. Similarly, the acoustic channel 254(A) is an opening that extends through acoustic port cover 250 from the external environment outside of the housing 240 to the second acoustic port 242(2). As such, the acoustic channel 254(A) acoustically couples the second acoustic port 242(2) to the external environment of the auditory prosthesis component 212.

Shown in FIG. 2C are two additional acoustic channels, namely acoustic channels 252(B) and 254(B). Acoustic channel 252(B) is an opening that extends through acoustic port cover 250 from the external environment outside of the housing 240 to the first acoustic port 242(1). As such, the acoustic channel 252(B) acoustically couples the first acoustic port 242(1) to the external environment of the auditory prosthesis component 212. Similarly, the acoustic channel 254(B) is an opening that extends through acoustic port cover 250 from the external environment outside of the housing 240 to the second acoustic port 242(2). As such, the acoustic channel 254(B) acoustically couples the second acoustic port 242(2) to the external environment of the auditory prosthesis component 212.

Collectively, FIGS. 2B and 2C illustrate that, in this example embodiment, the acoustic port cover includes a total of four (4) acoustic channels, where two acoustic channels are associated with each of the acoustic ports 242(1) and 242(2) (i.e., acoustic channels 252(A) and 252(B) acoustically couple acoustic port 242(1) to the external environment, while acoustic channels 254(A) and 254(B) acoustically couple acoustic port 242(2) to the external environment).

In the example of FIGS. 2B and 2C, the acoustic channels 252(A)/252(B) and 254(A)/254(B) are disposed generally transverse to the corresponding acoustic ports 242(1) and 242(2). As such, the acoustic channels 252(A)/252(B) and 254(A)/254(B) generally receive signals at the two opposing lateral sides of the housing 240.

More specifically, FIGS. 2B and 2C also illustrate that the acoustic channels associated with each of the acoustic ports 242(1) and 242(2) are disposed on opposite sides of the acoustic port cover 250. That is, acoustic channel 252(A) is disposed on a first side and 251(A) of the acoustic port cover 250, while the acoustic channel 252(B) is disposed on a second side and 251(B) of the acoustic port cover 250. Similarly, acoustic channel 254(A) is disposed on a first side and 251(A) of the acoustic port cover 250, while the acoustic channel 254(B) is disposed on a second side and 251(B) of the acoustic port cover 250. The positioning of the acoustic channels 252(A)/252(B) and 254(A)/254(B) on opposing sides of the acoustic port cover 250 may facilitate an omni-directional, or multi-directional, capture of acoustic sound signals at the microphones with the housing 240.

In certain electronic devices, the relative "sound spacing" between two microphones may be leveraged for certain sound processing operations, such as for beamforming, directional sound processing, etc. As used herein, the relative "sound spacing" between two microphones refers to the distance between two corresponding ingress points at which acoustic sound signals enter a structure for subsequent sound capture. In typical electronic devices, the two corresponding ingress points are the acoustic ports of the electronic device, which are directly above the microphones in the housing. As such, in typical arrangements, the relative sound spacing between two microphones positioned within a housing is simply the same as the spacing between the acoustic ports associated with those two microphones. The spacing of the acoustic ports, in turn, may be dictated by unrelated design considerations, which can potentially lead to a sub-optimal relative sound spacing between two microphones.

In accordance with embodiments presented herein, the relative sound spacing between two microphones is not controlled by the acoustic ports, but instead by the acoustic channels 252(A), 252(B), 254(A), and 254(B). More specifically, as shown in FIGS. 2B and 2C, the acoustic channels 252(A), 252(B), 254(A), and 254(B) include sound ingress openings 257(A), 257(B), 259(A), and 259(B), respectively. The sound ingress openings 257(A), 257(B), 259(A), and 259(B) are the ingress points for acoustic sound signals and, accordingly, these openings control/dictate the relative sound spacing between microphones positioned within the housing 240. In accordance with embodiments presented herein, the arrangement (e.g., angles, length, cross-sectional size, etc.) may be varied in different embodiments so as achieve an optimal spacing between corresponding openings (i.e., achieve an optimal spacing between openings 257(A) and 259(A) and between 257(B) and 259(B)) according to achieve preferred acoustic performance of the device (e.g., the spacing of the acoustic channels can be varied according to desired acoustic performance of the device). For example, the acoustic port cover 250 may be formed with acoustic channels 252(A), 252(B), 254(A), and 254(B) having ingress openings that 257(A), 257(B), 259(A), and 259(B) that have a spacing there between that is larger than the spacing between the acoustic ports. Such a larger relative sound spacing may be beneficial for, for example, beamforming and/or directional sound processing operations.

Figure 2D:
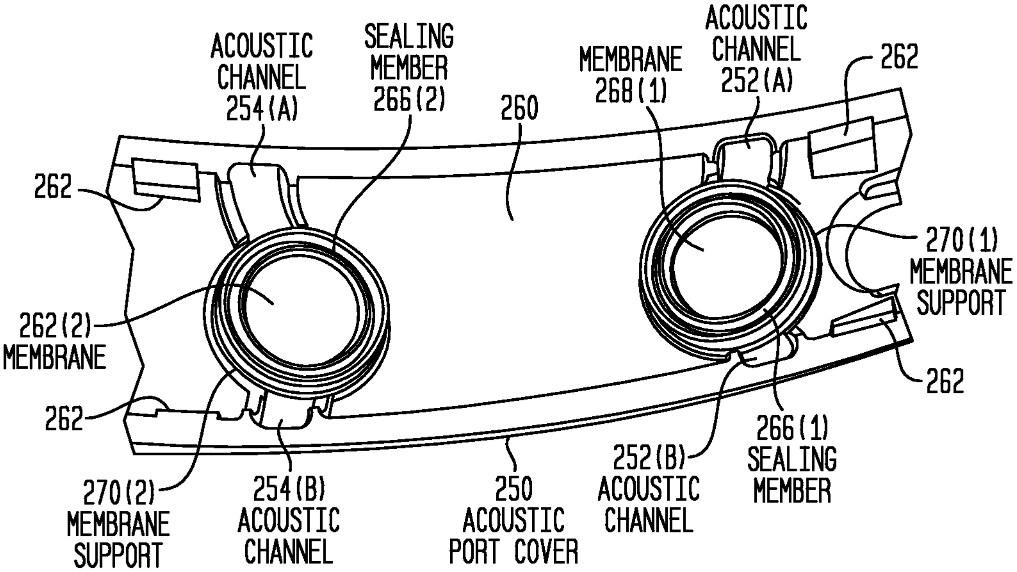
FIG. 2D is perspective view illustrating an inner surface of the acoustic port cover of FIGS. 2B and 2C and related components, in accordance with certain embodiments presented herein.
Figure 2E:
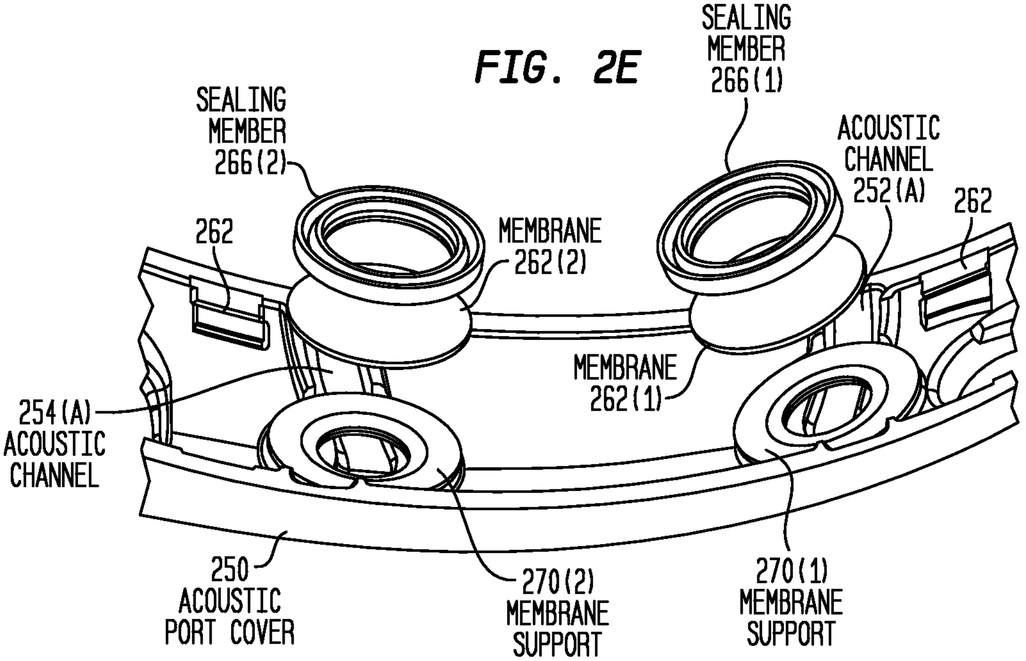
FIG. 2E is a partially-exploded view of the acoustic port cover and related components shown in FIG. 2D, in accordance with certain embodiments presented herein.

FIGS. 2B and 2C generally illustrate an outer or top side/surface 255 of the acoustic port cover 250 and, more particularly, sound ingress openings 257(A), 257(B), 259 (A), and 259(B) for each of the acoustic channels 252(A), 252(B), 254(A), and 254(B) (i.e., openings for entry of the acoustic sound signals). FIGS. 2D and 2E are schematic diagrams illustrating an inner or bottom surface 260 of the acoustic port cover 250 as well as other components configured to be disposed between the acoustic port cover 250 and the housing 240 of the auditory prosthesis component 212. In particular, FIG. 2D is a perspective view of the inner surface 260 of the acoustic port cover 250 and the other components, shown separate from the housing 240. FIG. 2E is a partially-exploded view illustrating the acoustic port cover 250 and the components configured to be disposed between the acoustic port cover 250 and the housing 240 of the auditory prosthesis component 212.

Figure 2G:
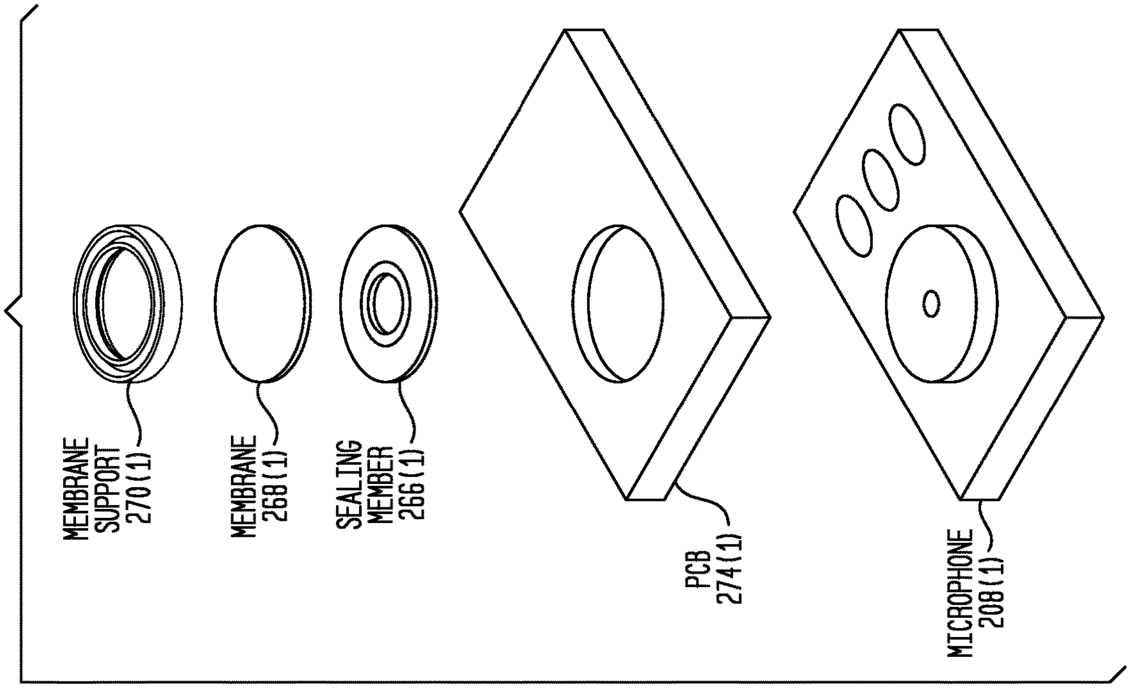
FIG. 2G is an exploded view illustrating further details of certain elements of FIG. 2F.
Figure 2F:
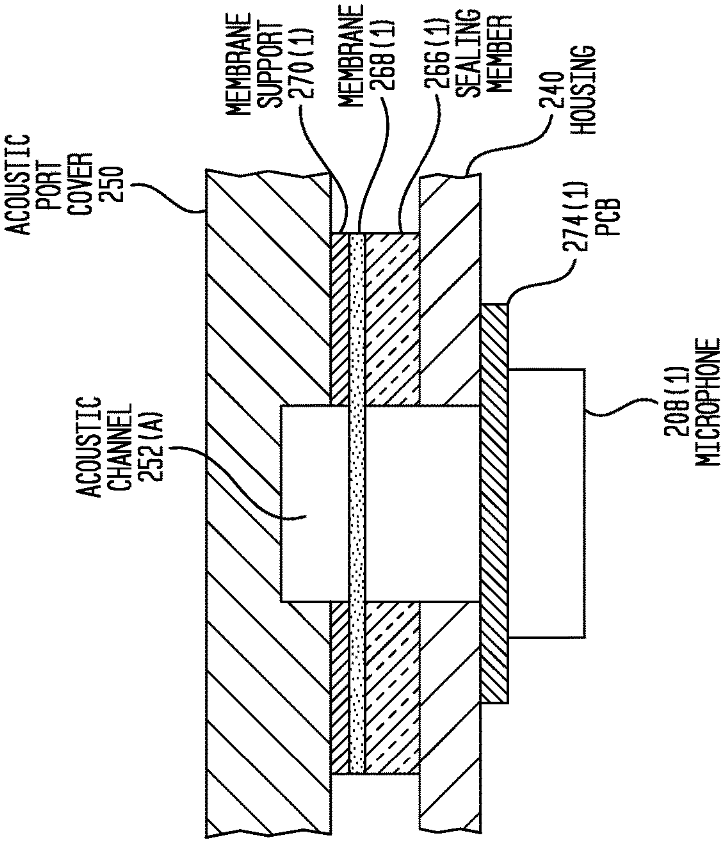
FIG. 2F is a cross-sectional view illustrating a portion of the acoustic port cover of FIGS. 2B and 2C attached to the auditory prosthesis component of FIG. 2A, in accordance with certain embodiments presented herein.
Figure 2I:
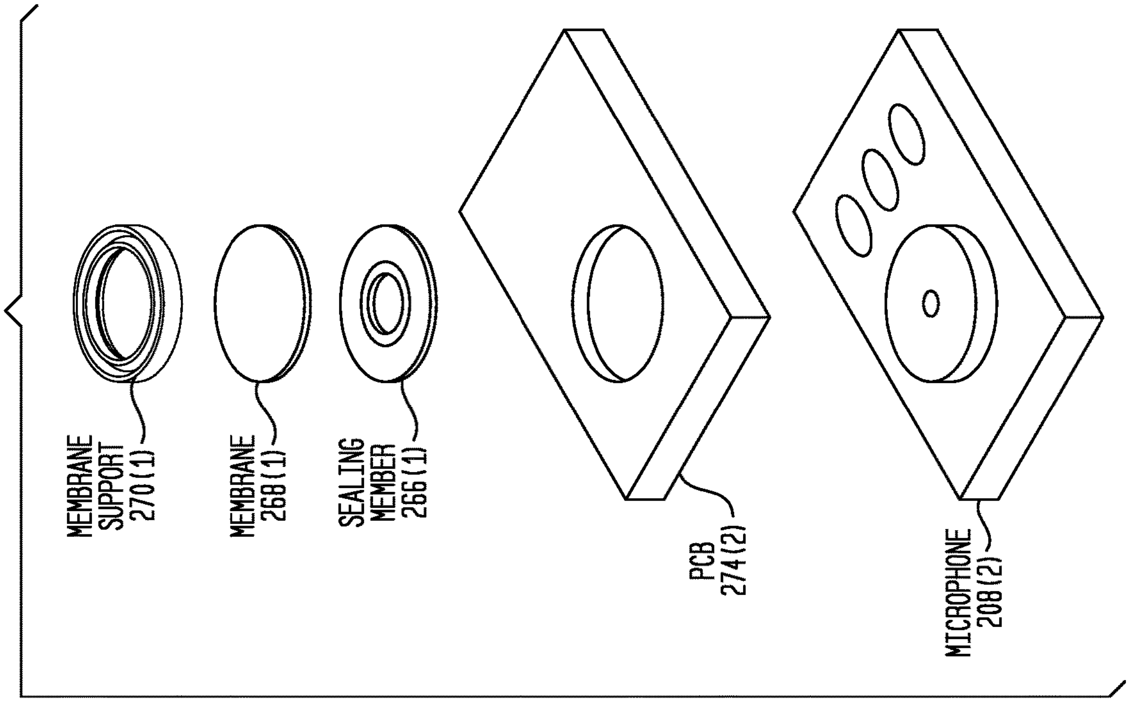
FIG. 2I is an exploded view illustrating further details of certain elements of FIG. 2H.
Figure 2H:
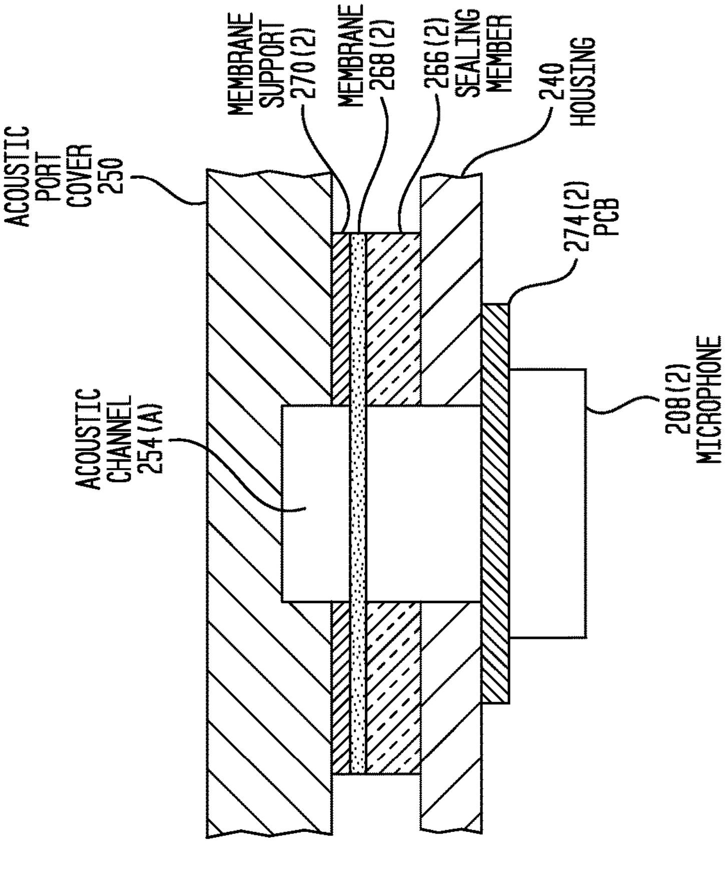
FIG. 2H is a cross-sectional view illustrating a portion of the acoustic port cover of FIGS. 2B and 2C attached to the auditory prosthesis component of FIG. 2A, in accordance with certain embodiments presented herein.

FIGS. 2F and 2H are first and second cross-sectional views, respectively, illustrating portions of the acoustic port cover 250, the components configured to be disposed between the acoustic port cover 250 and the housing 240, as well as components within the housing 240. In particular, FIG. 2F only illustrates the elements associated with acoustic port 242(1), while FIG. 2H only illustrates the elements associated with acoustic port 242(2). FIGS. 2G and 2I are exploded views of the components shown in FIGS. 2F and 2H, respectively, but omit the acoustic port cover 250 and the housing 240. For ease of description, FIGS. 2D, 2E, 2F, 2G, 2H, and 2I will be generally described together.

FIGS. 2D and 2E illustrate, among other elements, the acoustic channels 252(A), 252(B), 254(A), and 254(B) that acoustically couple the acoustic ports 242(1) and 242(2) (not shown in FIGS. 2D and 2E) to the external environment of the housing 240. As shown, the acoustic channels 252(A), 252(B), 254(A), and 254(B) are each at least partially formed by the inner surface 260 of the acoustic port cover 250. In the examples of FIGS. 2A-2I, the acoustic channels 252(A), 252(B), 254(A), and 254(B) are completely/fully formed by the inner surface 260 of the acoustic port cover 250. However, as described further below, in other embodiments acoustic channels may be formed by the inner surface of an acoustic port cover and/or by the outer surface of housing to which the acoustic port cover is attached.

Also shown in FIGS. 2D and 2E are a plurality of engagement features 262 disposed on the inner surface 260 of the acoustic port cover 250. The plurality of engagement features 262 are configured to mechanically mate with the one or more engagement features 246 (FIG. 2A) of the housing 240 to detachably couple/attach the acoustic port cover 250 to the outer surface 244 of the housing. In the examples of FIGS. 2A-2I, the plurality of engagement features 262 are configured to snap-lock with the one or more engagement features 246 of the housing 240. However, it is to be appreciated other types of engagement features may be used in accordance with embodiments presented herein in order to detachably couple an acoustic port cover to the outer surface 244 of a housing.

Shown in FIGS. 2D-2I are protective membranes 268(1) and 268(1), which are each formed from a contaminant-proof material, such as Polytetrafluoroethylene (PTFE). That is, the protective membranes 268(1) and 268(1) are hydrophobic and configured to prevent the passage of dirt, dust, and other contaminants there through. Protective membrane 268(1) is configured to be positioned between the acoustic port 242(1) and the acoustic channels 252(A) and 252(B), while protective membrane 268(2) is configured to be positioned between the acoustic port 242(2) and the acoustic channels 254(A) and 252(B). As such, the protective membranes 268(1) and 268(2) function as barriers to prevent the ingress of contaminants into the acoustic ports 242(1) and 242(2), respectively.

In the embodiments of FIGS. 2D-2G, the protective membranes 268(1) and 268(2) are disposed between the acoustic port cover 250 and the housing 240. Disposed between the protective membranes 268(1) and 268(2) and the acoustic port cover 250 are membrane supports 270(1) and 270(2), respectively. That is, the membranes 268(1) and 268(2) are coupled (e.g., attached) to the acoustic port cover 250 via respective membrane supports 270(1) and 270(2). In one example, the membrane supports 270(1) and 270(2) are silicone O-rings, although other arrangements are possible in accordance with embodiments presented herein.

In certain embodiments, the protective membranes 268(1) and 268(2) may be attached to the membrane supports 270(1) and 270(2) and/or to the housing acoustic port cover 250 (e.g., via the membrane supports). In other embodiments, the protective membranes 268(1) and 268(2) may be attached to only the membrane supports 270(1) and 270(2) or may be stand-alone components. However, in general, the protective membranes 268(1) and 268(2) may be replaceable (e.g., with the acoustic port cover 250 or separate from the acoustic cover 250).

Disposed between the membranes 268(1) and 268(2) and the housing 240 are gaskets or sealing members (seals) 266(1) and 266(2) that are configured to be positioned adjacent to the acoustic ports 242(1) and 242(2) (FIG. 2A), respectively. The sealing members 266(1) and 266(2) may be positioned adjacent to the housing 240 and include (e.g., define) an interior cavity disposed in-line with a respective acoustic ports 242(1) and 242(2). The sealing members 266(1) and 266(2) may be formed from a resiliently flexible material such that, when the acoustic port cover 250 is attached to the housing 240, the sealing members 266(1) and 266(2) may be compressed so as to prevent the ingress of contaminants around the membranes 268(1) and 268(2), respectively.

In certain embodiments, the sealing members 266(1) and 266(2) may be attached to the housing 240 (e.g., via interference fit with one or features of the housing, via an adhesive, etc.). In other embodiments, the sealing members 266(1) and 266(2) may be attached to the protective membranes 268(1) and 268(2), the membrane supports 270(1) and 270(2), and/or to the housing acoustic port cover 250 (e.g., via the protective membranes and the membrane supports). In other embodiments, the protective membranes 268(1) and 268(2) may be attached to only the protective membranes 268(1) and 268(2) and membrane supports 270(1) and 270(2) or may be stand-alone components. However, in general, the sealing members 266(1) and 266(2) may be replaceable (e.g., with the acoustic port cover 250 or separate from the acoustic cover 250).

In operation, the acoustic sound signals (sound waves) enter via ingress openings 257(A), 257(B), 259(A), and/or 259(B). The acoustic sound signals pass through acoustic channels 252(A)/252(B) and/or 254(A)/254(B) and then pass through membranes 268(1) and 268(2), respectively, and cause movement (vibration) of acoustic membranes (not shown) disposed in microphones 208(1) and 2028(2) positioned adjacent to the acoustic ports 242(1) and 242(2), respectively. The microphones 208(A) and 208(B) include a sound inlet 276(1) and 276(2), respectively, that receive the acoustic sound signals from the acoustic ports 242(1) and 242(2), respectively. The microphones 208(A) and 208(B) are each components that are configured to convert the movement of the acoustic membranes into electrical microphone signals that represent the acoustic sound signals impinging on the acoustic membranes. Depending on the microphone design, these electrical microphone signals may be analog or digital signals. In certain embodiments, the microphones 208(A) and 208(B) may be microelectromechanical systems (MEMS) microphones, although other types of microphones may be used in accordance with embodiments presented herein.

The microphones 208(A) and 208(B) are each electrically connected to an electrical circuit and are each configured to provide the respective electrical microphone signals to this electrical circuit. In the example of FIGS. 2F-2I, the electrical circuits are implemented on one or more printed circuit boards (PCBs), shown as PCBs 274(1) and 274(2). The auditory prosthesis component 212 may also include other components that, for ease of illustration, have been omitted from FIGS. 2A-2I. For example, although not shown in FIGS. 2F-2I, spouts may positioned within each of the acoustic ports 242(1) and 242(2) to guide/steer acoustic sound signals to the sound inlets 276(1) and 276(2), respectively.

In the example of FIGS. 2F-2I, the PCBs 274(1) and 274(2) are positioned between the microphones 208(1) and 208(2) the respective acoustic ports 242(1) and 242(2). As such, the PCBs 274(1) and 274(2) include openings 275(1) and 275(2), respectively, which allow the acoustic sound signals to reach the sound inlets 276(1) and 276(2).

FIGS. 2F and 2H illustrate the membrane supports 270(1) and 270(2), the outer edges of the membranes 268(1) and 268(2), and the sealing members 266(1) and 266(2) compressed between the acoustic port cover 250 and the housing 240. That is, in the arrangements of FIGS. 2F and 2H, the acoustic port cover 250, membranes 268(1) and 268(2), sealing members 266(1) and 266(2) are configured to substantially prevent the ingress of contaminants into the acoustic ports 242(A) and 242(B).

As noted, FIGS. 2A-2I illustrate one example arrangement for an acoustic port cover 250 for attachment to a housing 240 of an auditory prosthesis component 212. The auditory prosthesis component 212 may be, for example, a sound processing unit or other external component of a cochlear implant or other type of auditory prosthesis, such a hearing aid. However, as noted elsewhere herein, acoustic port covers in accordance with embodiments presented herein may also or alternatively be used with other electronic devices, such as a mobile phone, a computer, or other consumer electronic device needing high audio quality and a contaminant-proof design.

Figure 3:
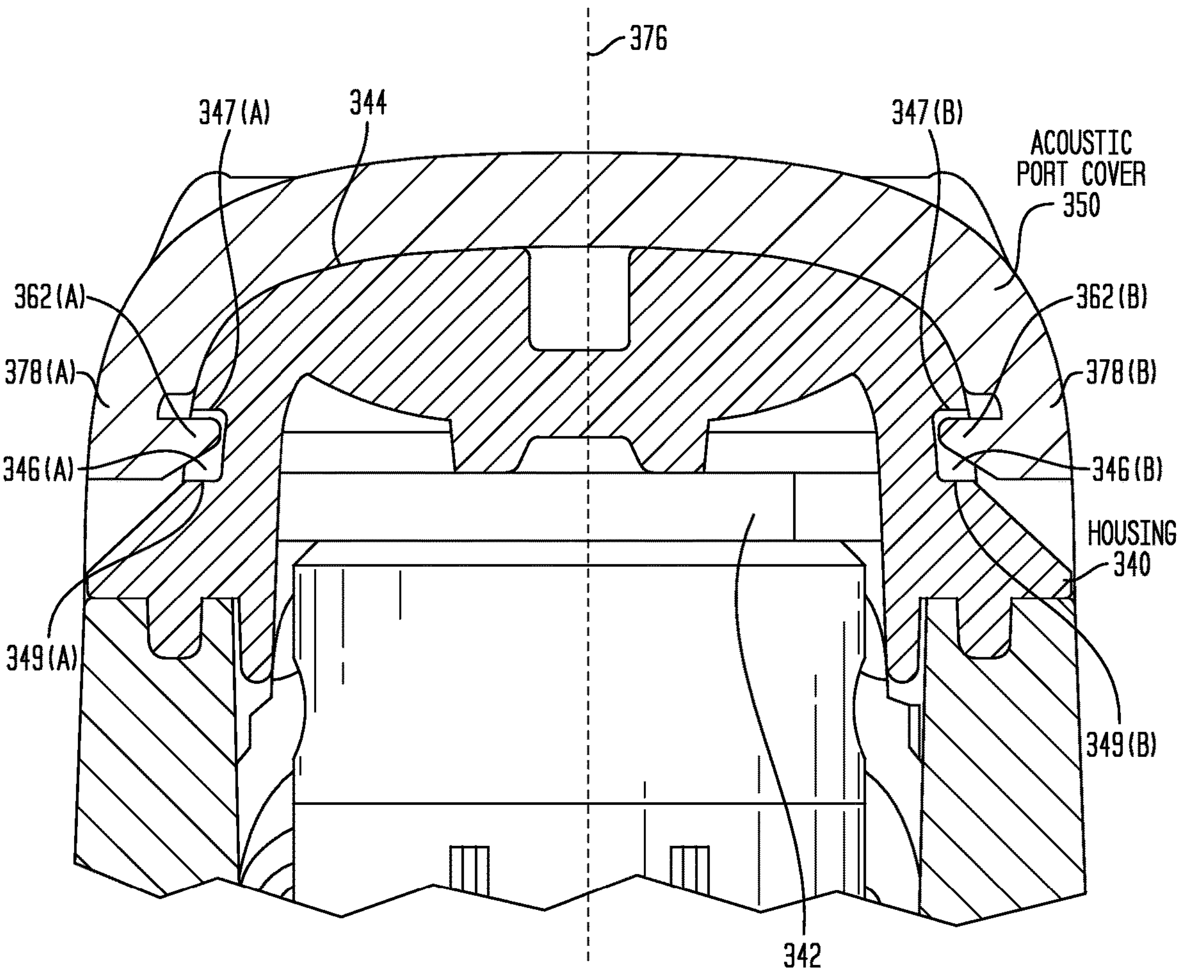
FIG. 3 is a cross-sectional view illustrating further details of an acoustic port cover and a housing of an electronic device, in accordance with certain embodiments presented herein.

As noted above, acoustic port covers/protectors in accordance with embodiments presented herein are configured to be detachably coupled to a housing so as to cover one or more acoustic ports of the housing. FIG. 3 is a cross-sectional diagram illustrating one example snap-lock arrangement/mechanism for detachably coupling/attaching an acoustic port cover 350 to the outer surface 344 of a housing 340. FIG. 3 is a cross-sectional view of the housing 340 at the location of an acoustic port 342.

More specifically, FIG. 3 illustrates that the acoustic port cover 350 comprises one or more engagement features in the form of longitudinal ridges 362(A) and 362(B) that each extends along at least a portion of an inner surface 360 of the acoustic port cover 350. The longitudinal ridges 362(A) and 362(B) are configured to mechanically mate with the one or more engagement features at the outer surface 344 of the housing 340, which in the example of FIG. 3 comprise indentations/concavities 346(A) and 346(B). That is, when the acoustic port cover 350 is placed on the outer surface 344 of the housing 340, the longitudinal ridges 362(A) and 362(B) are configured to be inserted into the indentations 346(A) and 346(B), respectively. When inserted, the indentations 346(A) and 346(B) mate with the longitudinal ridges 362(A) and 362(B) such that the acoustic port cover 350 can only be removed through application of an external force.

In the example of FIG. 3, the mechanical mating between the longitudinal ridges 362(A) and 362(B) are configured to be inserted into the indentations 346(A) and 346(B) can be a result of several factors. First, the indentations 346(A) and 346(B) include upper ledges 347(A) and 347(B), respectively, that are configured to engage the longitudinal ridges 362(A) and 362(B), respectively, to prevent or limit movement of the acoustic port cover 350 in a first direction that is parallel to an elongate axis 376 of the acoustic port 342.

Second, the indentations 346(A) and 346(B) include lower ledges 349(A) and 349(B), respectively, that are configured to engage the longitudinal ridges 362(A) and 362(B), respectively, to prevent or limit movement of the acoustic port cover 350 in a second direction that is parallel to an elongate axis 376 of the acoustic port 342, where the second direction is generally opposite to the first direction.

Third, in the example of FIG. 3, the longitudinal ridges 362(A) and 362(B) extend from arms 378(A) and 378(B), respectively, which are biased inward (i.e., in a direction generally perpendicular to the elongate axis 376 of the acoustic port 342). The inward bias of the arms 378(A) and 378(B) cause the longitudinal ridges 362(A) and 362(B) to remain in the indentations 346(A) and 346(B), absence application of an external force.

If the acoustic port cover 350 is to be detached from the housing 340, one or more external forces can be applied to remove the longitudinal ridges 362(A) and 362(B) from the indentations 346(A) and 346(B), respectively. For example, a force may be applied to apply pressure on one or more of the arms 378(A) and 378(B) in a direction that is substantially opposite to the inward bias, thereby dislodging one or more of the longitudinal ridges 362(A) and 362(B) from the indentations 346(A) and 346(B) and separating the acoustic port cover 350 is to be removed from the housing 340.

It is to be appreciated that FIG. 3 merely illustrates one example snap-lock coupling arrangement for use in attaching an acoustic port cover to a housing, in accordance with embodiments presented herein, and that other types and arrangements of snap-lock couplings may be used in other embodiments. For example, in another embodiment, an acoustic port cover may include a single ridge that extends around an inner surface of an acoustic port cover that is configured to mate with a corresponding single indentation that extends around an outer surface of a housing. In another embodiment, an acoustic port over and a housing may include a plurality of discrete coupling/connection locations formed by different corresponding sets of indentations and projections. In yet another embodiment, the one or more indentations may be disposed on the acoustic port cover and the one or more projections may be disposed on the housing to which the cover is attached. Again, these embodiments are merely illustrative.

In other embodiments, a different type of detachable coupling mechanism may be used in place of a snap-lock coupling arrangement. For example, the detachable coupling mechanism may be configured for an interference fit (e.g., the engagement features on the acoustic port cover are configured for an interference fit with the corresponding engagement features on the housing so as to retain the acoustic port cover to the housing, absent application of an external force). Alternatively, the engagement features on the acoustic port cover and the corresponding engagement features on the housing collectively form a locking slide-on mechanism (e.g., the acoustic port cover includes features that slide into features of the housing and, when inserted therein, are locked with the features of the housing, absent application of an external force). In other embodiments, the engagement features on the acoustic port cover and the corresponding engagement features on the housing may form a latching mechanism, a magnetic attachment mechanism, and hinge and latch arrangement, or the like.

Alternatively, acoustic port covers may include one or more engagement features configured to mechanically mate one or more of the acoustic ports of an electronic device. That is, the one or more engagement features may be inserted or snapped into one or more acoustic ports, but do not significantly obstruct or occlude one or more of the acoustic ports.

As noted, 2A-2I generally illustrate an acoustic port cover 250 in which the acoustic channels 252(A), 252(B), 254(A), and 254(B) are completely/fully formed by the inner surface 260 of the acoustic port cover 250. However, in accordance with embodiments presented herein, the acoustic channels may be formed only partially by the inner surface of an acoustic port cover, or may be formed by only the outer surface of housing to which the acoustic port cover is attached.

Figure 4:
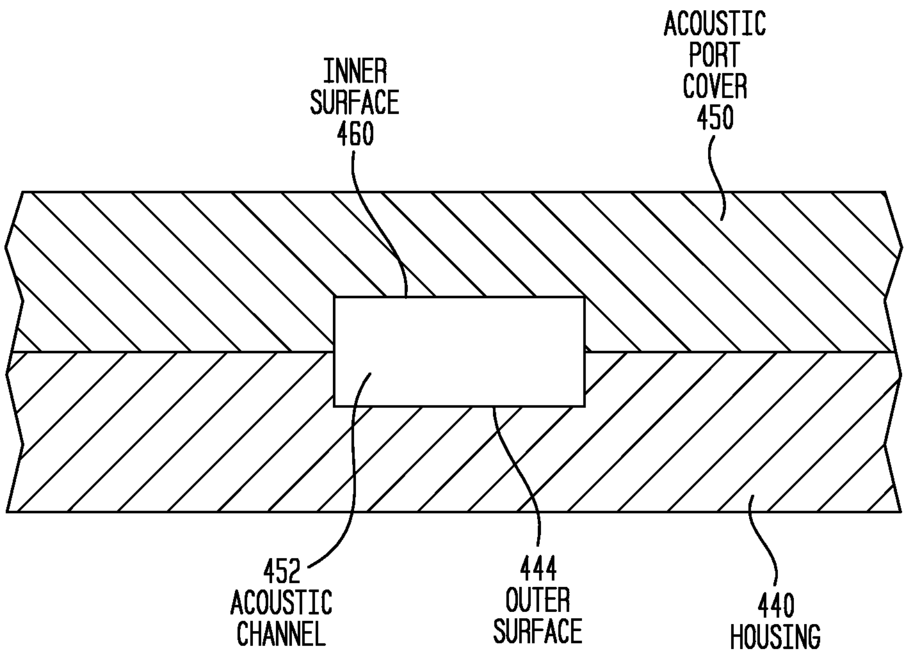
FIG. 4 is a side view of an acoustic port cover attached to a housing of an electronic device, in accordance with certain embodiments presented herein.

For example, FIG. 4 is a side view of an acoustic port cover 450 attached to a housing 440 of an electronic device. Also shown in FIG. 4 is an acoustic channel 452 that extends through both the acoustic port cover 450 and the housing 440. That is, in this example, both the inner surface 460 of the acoustic port cover 450 and the outer surface 444 of the housing 440 include areas that, when the acoustic port cover 450 is attached to a housing 440, collectively/jointly form the acoustic channel 452.

Figure 5:
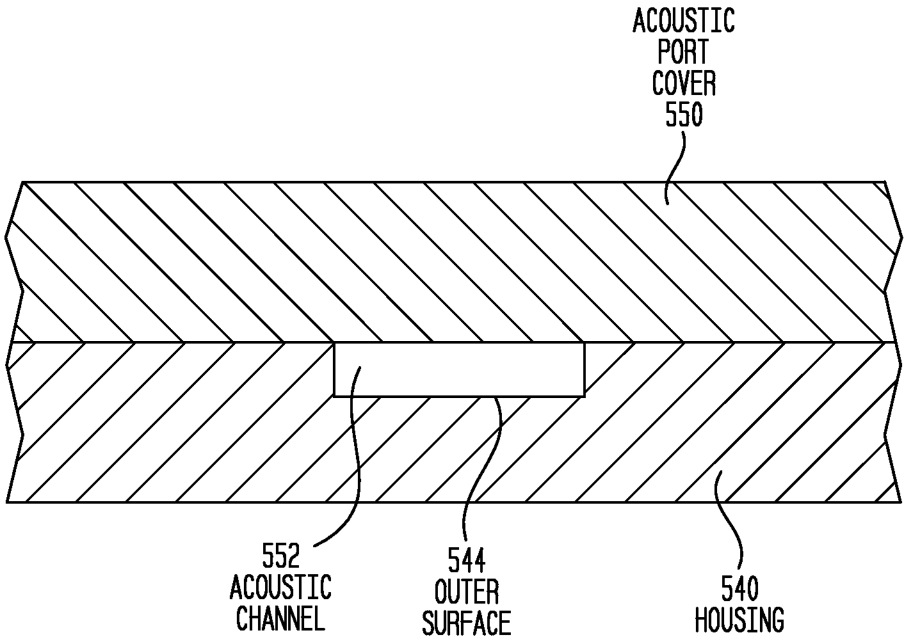
FIG. 5 is a side view of another acoustic port cover attached to a housing of an electronic device, in accordance with certain embodiments presented herein.

FIG. 5 is a side view of an acoustic port cover 550 attached to a housing 540 of an electronic device. Also shown in FIG. 5 is an acoustic channel 552 that extends only the housing 540. That is, in this example, only the outer surface 544 of the housing 540 includes an area that, when the acoustic port cover 550 is attached to a housing 540, forms the acoustic channel 552.

As noted above, merely for ease of description, the acoustic port covers presented herein have been primarily described herein with reference to one illustrative electronic device/apparatus, namely a medical device in the form of a cochlear implant. However, it is to be appreciated that the acoustic port covers presented herein may also be used with a variety of other devices that include one or more acoustic ports positioned within a housing. For example, the techniques presented herein may be used with computers (e.g., desktops, thin clients, laptops, tablet computers, etc.), mobile devices (e.g., mobile phones), etc., other medical devices, such other auditory prostheses, including acoustic hearing aids, bone conduction devices, middle ear auditory prostheses, direct acoustic stimulators, auditory brain stimulators), etc., and/or other any apparatuses having one or more acoustic ports.

Figure 6B:
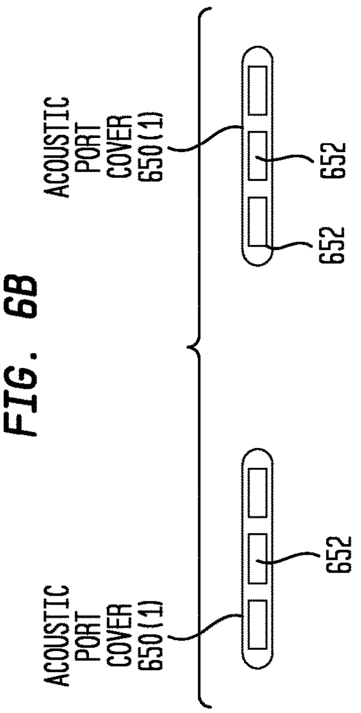
FIG. 6B is a side view of an acoustic port cover configured for attachment to the electronic device of FIG. 6A, in accordance with certain embodiments presented herein.
Figure 6C:
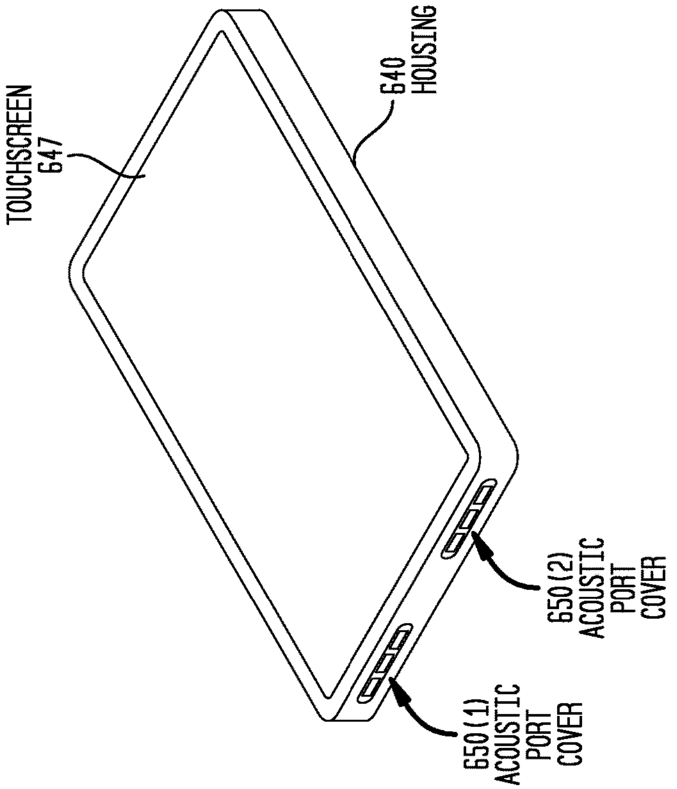
FIG. 6C is a perspective view of the acoustic port cover of FIG. 6B attached to the electronic device of FIG. 6A, in accordance with certain embodiments presented herein.
Figure 6A:
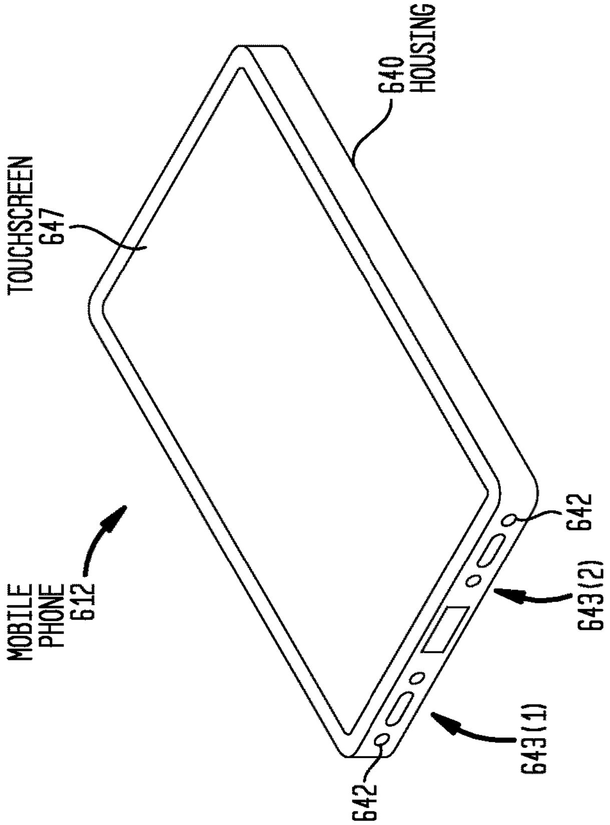
FIG. 6A is a perspective view of an electronic device to which an acoustic port cover may be attached, in accordance with certain embodiments presented herein.

For example, FIG. 6A is a perspective view of with a mobile phone 612 to which acoustic port covers in accordance with embodiments presented herein may be attached. FIG. 6B is side view of two acoustic port covers, referred to as acoustic port covers 650(1) and 650(2), configured to be attached to the mobile phone 612. FIG. 6C is a perspective view illustrating the acoustic port covers 650(1) and 650(2) attached to the mobile phone 612.

As shown in FIG. 6A, the mobile phone 612 includes a touchscreen 637 embedded in a housing 640. The housing 640 includes a plurality of acoustic ports 642 which, in this example, are arranged in two groups, referred to as acoustic port group 643(1) and acoustic port group 643(2). Disposed within the housing 640 are a number of electrical components, including one or more microphones positioned adjacent to the acoustic ports 642. In operation, the one or more microphones are acoustically coupled to the acoustic ports 642 so as to capture acoustic sound signals entering housing 640 via the acoustic ports. The acoustic ports 642 may include protective membranes configured to prevent contaminants from entering the housing 640.

As shown in FIG. 6B, the acoustic port covers 650(1) and 650(2) each include a plurality of acoustic channels 652. As shown in FIG. 6C, the acoustic port covers 650(1) and 650(2) are each configured to be detachably coupled to the housing 640 of the mobile phone 612 so as to remain attached to the housing 640 in the absence of an applied external force. In accordance some embodiments presented herein, the acoustic port covers 650(1) and 650(2) each include one or more engagement features configured to mate with one or more corresponding engagement features of the housing 640. In certain embodiments, the acoustic port covers 650(1) and 650(2) each includes one or more engagement features configured to mechanically mate one or more of the acoustic ports 642 (e.g., the or more engagement features mate with, but do not obstruct/occlude, one or more of the acoustic ports 642).

When mechanically coupled to the mobile phone 612, the acoustic port covers 650(1) and 650(2) cover/shield the acoustic port group 643(1) and acoustic port group 643(2), respectively. However, when coupled to the mobile phone 612, the acoustic channels 652 also allow acoustic sound signals to enter the acoustic ports 642. That is, the acoustic port covers 650(1) and 650(2) are configured to shield/cover the acoustic port(s) in the housing 640 from direct exposure to foreign materials/contaminants (e.g., water, sweat, dirt, dust, etc.), but still allow/enable acoustic sound signals to enter the housing via the acoustic port(s).

FIGS. 6A-6C illustrate an embodiment in which two acoustic port covers and are directly coupled to the housing of a mobile phone. In accordance with certain embodiments presented herein, acoustic port covers may integrated into a larger component that is coupled to the housing of an electronic device (e.g., acoustic port cover(s) are indirectly coupled to a housing of an electronic device). For example, FIGS. 7A-7C illustrate an embodiment in which acoustic port covers are integrated as a component of a protective case for attachment to a mobile phone.

Figure 7A:
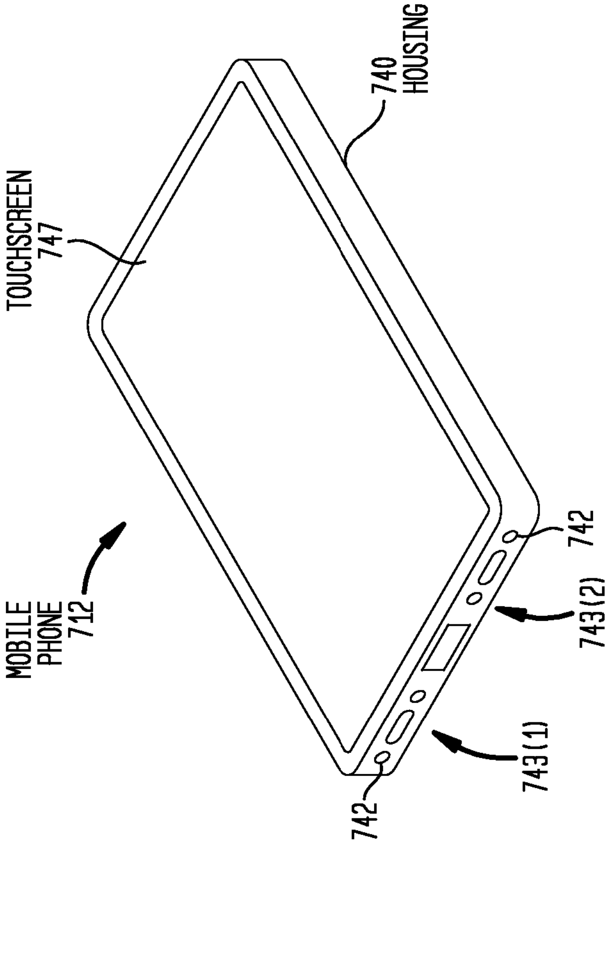
FIG. 7A is a perspective view of an electronic device to which an acoustic port cover may be attached, in accordance with certain embodiments presented herein.

FIG. 7A is a perspective view of with a mobile phone 712 to which a protective case with acoustic port covers in accordance with embodiments presented herein may be attached. FIG. 7B is side view of a protective case 780 having two acoustic port covers, referred to as acoustic port covers 750(1) and 750(2) integrated therein. FIG. 7C is a perspective view illustrating the protective case 780, with acoustic port covers 750(1) and 750(2), attached to the mobile phone 712.

As shown in FIG. 7A, the mobile phone 712 includes a touchscreen 737 embedded in a housing 740. The housing 740 includes a plurality of acoustic ports 742 which, in this example, are arranged in two groups, referred to as acoustic port group 743(1) and acoustic port group 743(2). Disposed within the housing 740 are a number of electrical components, including one or more microphones positioned adjacent to the acoustic ports 742. In operation, the one or more microphones are acoustically coupled to the acoustic ports 742 so as to capture acoustic sound signals entering housing 740 via the acoustic ports. The acoustic ports 742 may include protective membranes configured to prevent contaminants from entering the housing 740.

Figure 7B:
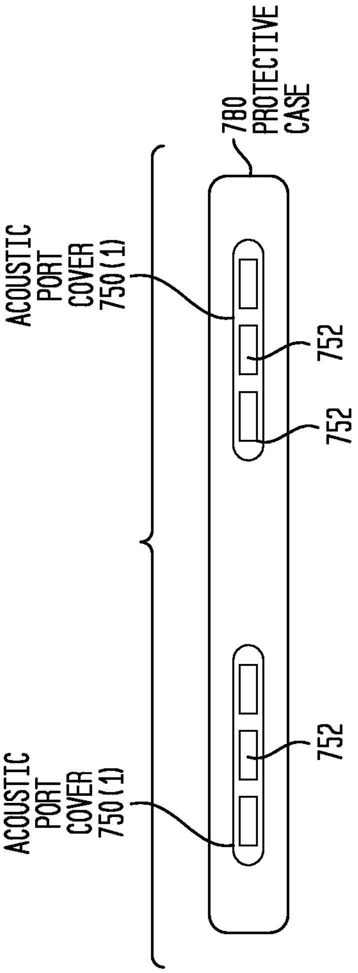
FIG. 7B is a side view of an acoustic port cover configured for attachment to the electronic device of FIG. 7A, in accordance with certain embodiments presented herein.
Figure 7C:
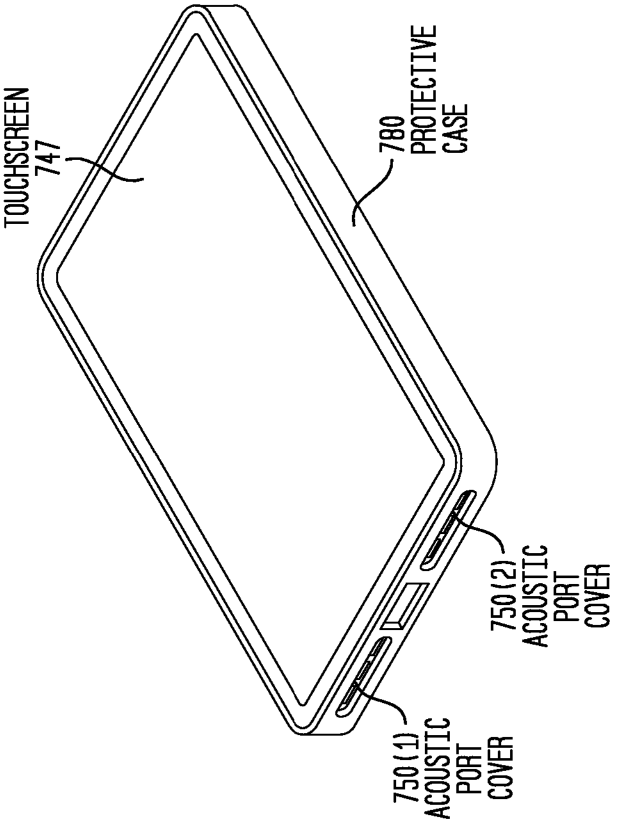
FIG. 7C is a perspective view of the acoustic port cover of FIG. 7B attached to the electronic device of FIG. 7A, in accordance with certain embodiments presented herein.

As shown in FIG. 7B, the acoustic port covers 750(1) and 750(2) are integrated in (e.g., are formed as part of) a protective case 780 configured for attachment to mobile phone 712. That is, the protective case 780 may mate with a portion of the housing 740 and is configured to facilitate utilization of the mobile phone 712 (e.g., via touch screen 747), while at the same time providing a protective covering to the mobile phone so that the mobile phone is not damaged if it is, for example, inadvertently bumped/dropped and/or submerged in a liquid, etc. The acoustic port covers 750(1) and 750(2) each include a plurality of acoustic channels 752.

As shown in FIG. 7C, the protective case 780, with acoustic port covers 750(1) and 750(2), is configured to be detachably coupled to the housing 740 of the mobile phone 712 so as to remain attached to the housing 740 in the absence of an applied external force. When the protective case 780 is coupled to the mobile phone 712, the acoustic port covers 750(1) and 750(2) cover/shield the acoustic port group 743(1) and acoustic port group 743(2), respectively. However, when the protective case 780 is coupled to the mobile phone 712, the acoustic channels 752 also allow acoustic sound signals to enter the acoustic ports 742. That is, the acoustic port covers 750(1) and 750(2) are configured to shield/cover the acoustic port(s) in the housing 740 from direct exposure to foreign materials/contaminants (e.g., water, sweat, dirt, dust, etc.), but still allow/enable acoustic sound signals to enter the housing via the acoustic port(s).

It is to be appreciated that the embodiments presented herein are not mutually exclusive and that the various embodiments may be combined with another in any of a number of different manners.

The invention described and claimed herein is not to be limited in scope by the specific preferred embodiments herein disclosed, since these embodiments are intended as illustrations, and not limitations, of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. An apparatus, comprising:

a housing;

at least one acoustic port extending through the housing;

a microphone positioned within the housing and comprising a sound inlet acoustically coupled to the at least one acoustic port;

at least one acoustic port cover configured to be detachably coupled to the housing to shield the at least one acoustic port from direct exposure to contaminants;

a support member engaged with the at least one acoustic port cover, wherein the support member defines a first opening;

a protective membrane mounted to the support member to cover the first opening;

a sealing member defining a second opening, wherein the protective membrane is mounted to the sealing member to cover the second opening, and wherein the sealing member is configured to compress against the housing to form a fluid-proof seal between the protective membrane and the housing; and at least one acoustic channel at least partially formed into the at least one acoustic port cover to extend between the at least one acoustic port cover and the support member and through the first opening of the support member, the protective membrane, and the second opening of the sealing member to acoustically couple the at least one acoustic port to an external environment of the housing, wherein the at least one acoustic channel extends between ledges of the at least one acoustic port cover, and the ledges are engaged with the support member to offset the support member from an inner surface of the at least one acoustic port cover to extend the at least one acoustic channel between the inner surface and the support member.

2. The apparatus of claim 1, wherein the sealing member is configured to compress against an outer surface of the housing, and wherein the at least one acoustic channel extends between the inner surface of the at least one acoustic port cover and the outer surface of the housing.

3. The apparatus of claim 1, wherein the at least one acoustic channel is disposed generally transverse to the at least one acoustic port.

4. The apparatus of claim 1, wherein the at least one acoustic port cover is configured to mechanically couple to the housing to compress the sealing member against the housing.

5. The apparatus of claim 1, wherein the at least one acoustic port cover and the housing include corresponding engagement features configured to mate with one another to couple the at least one acoustic port cover to the housing.

6. The apparatus of claim 1, wherein the microphone is a microelectromechanical systems (MEMS) microphone attached to a first surface of a printed circuit board (PCB), and wherein the PCB is located substantially between the MEMS microphone and at least one acoustic port.

7. The apparatus of claim 1, wherein the at least one acoustic channel comprises a first acoustic channel having a first sound ingress opening and a second acoustic channel having a second sound ingress opening, wherein the first acoustic channel is associated with a first acoustic port of the at least one acoustic port extending through the housing, the second acoustic channel is associated with a second acoustic port of the at least one acoustic port extending through the housing, and wherein the first and second sound ingress openings have a relative sound spacing that is greater than a spacing between the first and second acoustic ports.

8. The apparatus of claim 1, wherein a first portion of the at least one acoustic channel is formed between the at least one acoustic port and the housing, and a second portion of the at least one acoustic channel is formed between the at least one acoustic port and the support member.

9. The apparatus of claim 8, wherein the first portion of the at least one acoustic channel and the second portion of the at least one acoustic channel are continuous with one another.

10. The apparatus of claim 1, wherein the ledges of the at least one acoustic port cover extend over the first opening of the support member.

11. The apparatus of claim 1, wherein the sealing member is external to the at least one acoustic port.

12. An acoustic port cover, comprising:

an outer surface;

an inner surface configured to be detachably coupled to a housing of an electronic device so as to fully cover at least one acoustic port extending through the housing of the electronic device;

ledges extending from the inner surface;

a support member engaged with the ledges and offset from the inner surface, wherein the support member defines a first opening;

a protective membrane mounted to the support member to cover the first opening;

a sealing member defining a second opening, wherein the protective membrane is mounted to the sealing member to cover the second opening, and wherein the sealing member is configured to compress against the housing to form a fluid-proof seal between the protective membrane and the housing; and one or more channels extending between the ledges, wherein the one or more channels extend between the inner surface and the support member and through the first opening of the support member, the protective membrane, and the second opening of the sealing member to acoustically couple the at least one acoustic port to an external environment of the housing.

13. The acoustic port cover of claim 12, wherein the protective membrane is configured to extend over the at least one acoustic port to limit contaminants at the outer surface of the acoustic port cover from reaching the at least one acoustic port.

14. The acoustic port cover of claim 12, wherein the inner surface of the acoustic port cover is configured to directly mechanically attach to an outer surface of the housing of the electronic device.

15. The acoustic port cover of claim 14, wherein the inner surface includes one or more engagement features configured to mechanically mate with one or more corresponding engagement features at the outer surface of the housing.

16. The acoustic port cover of claim 12, wherein the sealing member is configured to mechanically mate with the housing at the at least one acoustic port.

17. The acoustic port cover of claim 12, wherein the inner surface of the acoustic port cover is configured to indirectly mechanically attach to an outer surface of the housing of the electronic device.

18. The acoustic port cover of claim 12, wherein the protective membrane is positioned between the at least one acoustic port and the one or more channels when the inner surface is detachably coupled to the housing of the electronic device.

19. The acoustic port cover of claim 12, wherein each of the one or more channels includes a second elongate axis that extends at an angle relative to an elongate axis of the at least one acoustic port to the outer surface of the acoustic port cover.

* * * * *